United States Patent Office
3,200,103
Patented Aug. 10, 1965

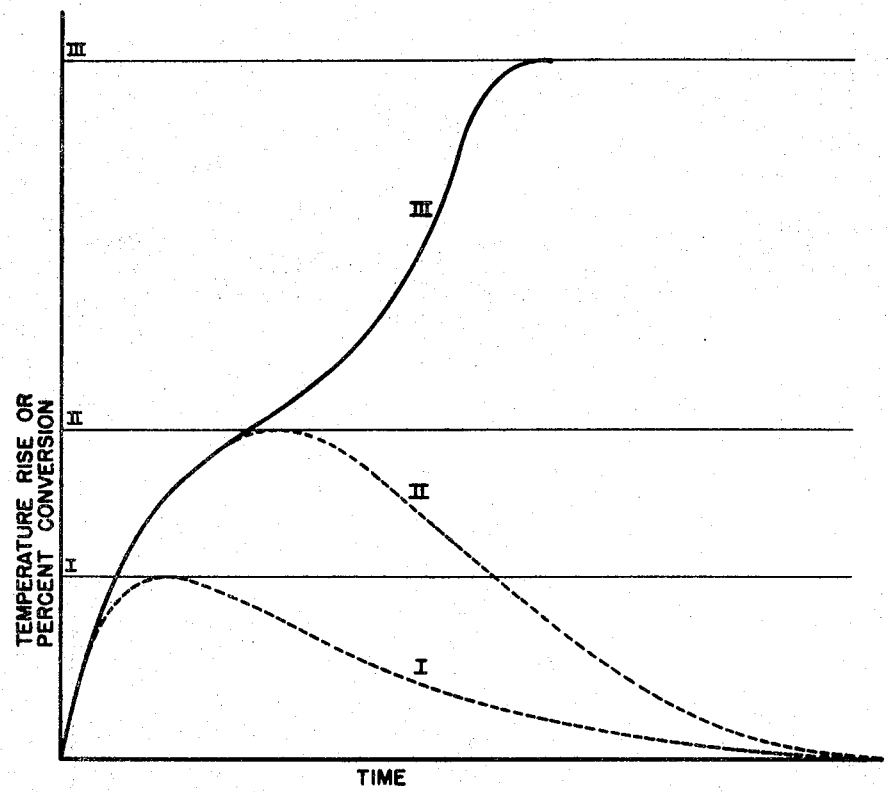

3,200,103
VINYL POLYMERIZATION PROCESS USING A CATALYST OF ALUMINUM ALKYL COMPOUND, OXYGEN AND PEROXIDIZED VINYL MONOMER
Rajendra N. Chadha, Silver Spring, Md., assignor to W. R. Grace & Co., a corporation of Connecticut
Filed Jan. 8, 1963, Ser. No. 250,121
36 Claims. (Cl. 260—89.1)

The present invention relates to a novel and useful composition of matter, and improved polymerization process utilizing the composition and the product resulting from the polymerization process. More particularly it is directed to a vinyl monomer composition, an improved polymerization process employing a peroxidized vinyl monomer and the product resulting from the polymerization process.

In a copending application, S.N. 101,328, filed April 7, 1961, now U.S. Patent 3,117,122, issued January 7, 1964, it is disclosed that vinyl monomers may be polymerized by subjecting the monomer to the action of a catalyst comprising an alkyl aluminum compound and oxygen. However, the invention has some drawbacks in that, under atmospheric conditions, the yields or percentage conversion of the monomer to a polymer and the rate of polymerization are relatively low. Also, the optimum concentration of oxygen is generally not the amount normally found in air and consequently if the best yields and polymerization rate are to be obtained, it is necessary to adjust oxygen concentration. Obviously, if a polymerization system could be found which could be carried out in the substantial absence of oxygen or which would improve the yields and/or reaction rate, it would receive widespread acceptance in the art.

Accordingly, it is an object of the present invention to provide a vinyl monomer composition which will polymerize without substantial exposure to an oxygen containing gas such as air. A further object is to provide a vinyl monomer composition which will give fast reaction rates and high rates of conversion when reacted in conjunction with an oxygen containing gas such as air. Another object is to provide an improved polymerization process. A still further object is to provide the product resulting from the improved polymerization process. Other objects will become apparent as the description of the invention proceeds.

These objects are accomplished by the present invention which provides a composition of matter comprising (A) a non-gaseous vinyl monomer, (B) an alkyl aluminum compound, (C) from 0 to about 5% by weight of a free radical initiating azo compound, and (D) a peroxidized vinyl monomer containing a plurality of the groups —R—O—O—, wherein R is the residue of a nongaseous vinyl monomer, with the peroxidic oxygen group (—O—O—)

being present in amounts of at least about 0.05% by weight; all percentages being based on the total weight of the vinyl monomers present in the composition. In a preferred embodiment of the present invention, the vinyl monomer is an acrylic acid ester, ethylene dimethacrylate, vinyl acetate, vinyl propionate or styrene, and it is used in conjunction with a trialkyl aluminum compound and peroxidized ethylene dimethacrylate or vinyl propionate.

The present invention also provides an improved process for the polymerization of a nongaseous vinyl monomer reactant by contacting said monomer with an alkyl aluminum compound, the improvement comprising carrying out the polymerization in the presence of (A) from 0 to about 5% by weight of a free radical initiating azo compound, and (B) a peroxidized vinyl monomer containing a plurality of the groups —R—O—O—, wherein R is the residue of a nongaseous vinyl monomer, with the peroxidic oxygen group (—O—O—) being present in amounts of at least about 0.05% by weight; all percentages being based on the total weight of the vinyl monomers present in the process. In a preferred embodiment of the present invention, the improved process is carried out in the presence of an oxygen containing gas such as air.

The invention further provides the polymerized product resulting from the aforementioned improved polymerization process—the exact composition of the product not being known.

The term "nongaseous" merely signifies that the vinyl monomer is not a gas under standard conditions of temperature and pressure. In short, the vinyl monomer is either a liquid or solid.

The expression a "vinyl monomer" is used to signify a compound of the formula

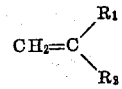

wherein $R_1$ is hydrogen or an organic radical and $R_2$ is an organic radical. The vinyl monomers are well-known in the art and include such material as acrylic acid esters, vinyl esters, allyl esters, vinyl nitriles, styrenes and the like. Among the suitable acrylic acid esters which may be employed in the present invention are: methyl acrylate; ethyl acrylate; n-propyl acrylate; isopropyl acrylate; n-butyl acrylate; isobutyl acrylate; sec-butyl acrylate; tert-butyl acrylate; n-pentyl acrylate; n-hexyl acrylate; 2-ethylbutyl acrylate; 2-ethylhexyl acrylate; n-heptyl acrylate; n-octyl acrylate; 3,5,5-trimethylhexyl acrylate; octadecyl acrylate; cyclopentyl acrylate; cyclohexyl acrylate; abitol acrylate (mixed isomers); n-decyl acrylate; tridecyl acrylate; 3,3,5-trimethylcyclohexyl acrylate; 2-n-butoxyethyl acrylate; 2-ethoxyethyl acrylate; 3-ethoxypropyl acrylate; 3-methoxybutyl acrylate; 2-methoxyethyl acrylate; benzyl acrylate; 2-phenoxyethyl acrylate; phenyl acrylate; 2-phenylethyl acrylate; 2-bromoethyl acrylate; 2-chloroethoxyethyl acrylate; 2-chloroethyl acrylate; 2,2,2-trifluoroethyl acrylate; N,N-diethyllaminoethyl acrylate; 1,1-dihydroheptafluorobutyl acrylate; N,N - dimethylaminoethyl acrylate; 2-N-morpholinoethyl acrylate and tetrahydrofurfuryl acrylate.

Other suitable vinyl monomers include: abitol methacrylate; acrylamide; acrylonitrile; acrylyl chloride; allyl acetic acid; allylidene diacetate; allyl acetate; N-allyl acrylamide; allyl beta-allyloxypropionate; allylamine; N-allyl aniline; allyl anthranilate; allylbenzene; allyl benzoate; allyl bromide; allyl n-butyrate; allyl carbamate; allyl chloride; allyl chloroacetate; allyl cinnamate; allyl crotonate; allylcyanide; allyl ether; allyl 2-ethylbutyrate; allyl ethyl ether; allyl glycol ether; allyl n-heptanoate; allyl hexoate; allyl n-hexyl ether; allyl isocyanate; allyl laurate; allyl methacrylamide; allyl methacrylate; allyl myristate; allyl octanoate; allyl palmitate; allyl pelargonate; allyl phenoxyacetate; allyl phenyl acetate; allyl phenyl ether; allyl propionate; allyl stearate; allyl trifluoroacetate; allylurea; allyl n-valerate; allyl iso-valerate; n-amyl methacrylate; iso-amyl methacrylate; benzyl methacrylate; 2-bromoethyl methacrylate; 2,2-butoxyethyl methacrylate; N-tert-butylacrylamide; sec-butyl methacrylate; iso-butyl methacrylate; tert-butyl methacrylate; 2-chloroethylmethacrylate; N-(parachlorophenyl)-acrylamide; N-(para-chlorophenyl)-methacrylamide; 2-chlorostyrene; 3-chlorostyrene; 4-chlorostyrene; cinnamyl methacrylate; beta-cyanoethyl methacrylate; cyclohexyl methacrylate; cyclopentyl methacrylate; 9-decenyl isocyanate; n-decyl methacrylate; N,N-diallylacrylamide; diallyl adipate; diallyl amine; diallyl diglycolate; diallyl malonate; N,N-diallyl methacrylamide; diallyl phthalate; 2,5-dichlorostyrene; N,N-diethylacrylamide; N,N-diethylaminoethyl methacrylate; 1,1-dihydroheptafluorobutyl methacrylate; N,N-dimethylallylamine; N,N-dimethylaminoethyl methacrylate; 2-ethoxyethyl methacrylate; ethylene dimethacrylate; 2-ethylhexoxyethyl methacrylate; 2-ethylhexyl methacrylate; ethyl methacrylate; furfuryl methacrylate; n-heptyl methacrylate; n-hexyl methacrylate; n-lauryl methacrylate; lauryl methacrylate; methacrylamide; methallyl chloride; 3-methoxybutyl methacrylate; 2-methoxyethyl methacrylate; methyl methacrylate; alpha-methylstyrene; N-(beta-naphthyl) methacrylamide; octadecyl methacrylate; octyl methacrylate; n-octyl methacrylate; 2-phenoxyethyl methacrylate; 2-phenylethyl methacrylate; n-propyl methacrylate; iso-propyl methacrylate; styrene; tetraethyleneglycol dimethacrylate; 3,3,5-trimethylcyclohexyl methacrylate; 3,5,5-trimethylhexyl methacrylate; vinyl acetate; vinyl n-butyl ether; vinyl isobutyl ether; vinyl butyrate; vinyl 2-chloroethyl ether; vinyl n-decanoate; vinyl ethylether; vinyl 2-ethylhexoate; vinyl 2-ethylhexyl ether; vinyl iodide; vinyl laurate; vinyl methacrylate; vinyl 2-methoxyethyl ether; vinyl n-octanoate; vinyl oleate; vinyl phenylacetate; vinyl propionate and vinyl stearate. The monomers may be used individually or in various combinations. Many others are known in the art and may likewise be used.

The "alkyl aluminum compounds" useful in the practice of the present invention are any of the well-known class compounds having the formula

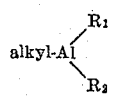

wherein $R_1$ and $R_2$ are each hydrogen, halogen or alkyl radicals. Among the various alkyl aluminum compounds which may be employed are triethyl aluminum; triethyl aluminum/diethyl aluminum hydride mixtures; triisobutyl aluminum; trimethyl aluminum; diethyl aluminum chloride; ethyl aluminum sesquichloride; methyl aluminum sesquichloride; methyl aluminum sesquibromide; trioctyl aluminum; tri-n-butyl aluminum; triisopropyl aluminum; tridodecyl aluminum; diethyl methyl aluminum; diethyl isobutyl aluminum; diisobutyl ethyl aluminum; diethyl aluminum bromide; diisobutyl aluminum chloride; diisobutyl aluminum bromide; dioctyl aluminum chloride; didodecyl aluminum chloride; diethyl aluminum hydride; diisobutyl aluminum hydride; dioctyl aluminum hydride and the like. The alkyl aluminum compounds may be employed individually or in various mixtures.

The "alkyl aluminum compounds" may also be employed in the complex form. Such complexes are known in the art and are formed by merely mixing the alkyl aluminum compound with the complexing agent in an inert medium. The mixing is preferably carried out at room temperature or below. The inert medium may be a gas such as nitrogen, argon, helium and the like or an inert hydrocarbon such as benzene or cyclohexane. The complexing agent may be any of those well-known in the art such as the carbonyl compounds, amides, amines and the like. Among the suitable complexing compounds are vinyl acetate, vinyl propionate, ethyl acetate, butyl acrylate, 2-ethylhexyl acrylate, benzyl acrylate, pyridine, ammonia, diethyl amine, triethyl amine, butyl amine, dimethyl acetamide, acetone and the like. Other complexing agents are known in the art and may be used as desired.

In general, the aluminum alkyl compound adds to the complexing agent in approximate equimolar amounts and correspondingly the weight basis of the complex should be adjusted so that approximately the same amount of the aluminum alkyl compound is present for the reaction. For example, if 0.2 gram of diisobutyl aluminum hydride would normally be employed in the reaction, about 0.38 gram of this compound complexed with butyl acrylate would be necessary when the complex is used in order to have present the desired 0.2 gram of dibutyl aluminum hydride.

The expression "free radical initiating azo compound" signifies the well-known group of compounds of the formula R—N=N—R (wherein R is an organic radical) which dissociate to form free radicals. Such compounds, for example, are disclosed in "Journal of the American Chemical Society," vol. 71, p. 747 and 2661 (1949), vol. 73, p. 4880 (1951) and vol. 74; 2027 (1952). Many others are given in Walling, "Free Radicals in Solution," p. 511–22 (1957) and U.S.P. 2,471,959. Among the suitable compounds are azo-bis-diphenylmethane, 1-azo-bis-1-phenylethane, phenyl-azo-triphenylmethane, phenyl-azo-diphenylmethane, diethyl- or dimethyl-2-azo-bis-iso-butyrate and the like. A particularly preferred class of free radical initiating azo compounds are those of the formula

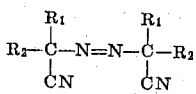

wheren $R_1$ is hydrogen or an organic radical and $R_2$ is an organic radical. Typical examples of such compounds are 2-azo-bis-isovaleronitrile, 2 - azo - bis - 2-ethylbutyronitrile, 2-azo-bis-isobutyronitrile, 2-azo-bis-2-methylbutyronitrile, 2-azo-bis - 2 - methylheptonitrile, 1 - azo - bis-1 - cyclohexanecarbonitrile, 4 - azo - bis-4-cyanopentanoic acid, 2 - azo - bis - 2,4 - dimethylvaleronitrile, 2-azo-bis-2-methylvaleronitrile, 2 - azo-bis-2-methylisovaleronitrile, 2-azo-bis-2,3-dimethylbutyronitrile, 2-azo-bis-2-methyl-3-phenylpropionitrile, 2-azo-bis-2-methyl-3-p-(Cl or $NO_2$) phenylpropionitrile and 2-azo-bis-2-methyl-2-cyclohexylacetonitrile. Such compounds may be used individually or in various mixtures. Many others are known in the art and may likewise be used. When such compounds dissociate to form free radicals at higher temperatures, heating may be used in the polymerization process.

The expression "peroxidized vinyl monomer" is used to signify a monomer which has been oxidized so as to contain the peroxidic (—O—O—) group. The peroxidized monomers are prepared according to the procedure set forth in "Journal of the American Chemical Society," vol. 78, p. 1017, 1956 and vol. 80, p. 2465, 1958. As pointed out in these articles, the peroxidized monomers are generally formed at somewhat above room temperature by bubbling oxygen through the monomer in the presence of azo-bis-isobutyronitrile as a catalyst. When the monomer is a liquid, no liquid diluent is required for the oxidation. When the monomer is a solid, the monomer is dissolved in an inert solvent and oxidation takes place in solution. Temperatures higher or lower than room temperature can be used depending on the monomer and the time required for oxidation. Preferably slightly elevated temperatures are employed to hasten the reaction. Temperatures of about 50–60° C. for a 24 hour oxidation period will give quite good results. For the lower temperatures, or in the absence of a catalyst, a longer period may be required if the same peroxidic oxygen content is desired.

While the aforementioned article postulates the formula of the resulting peroxidized monomer as $[MO_2]_n$, wherein M is the residue of the vinyl monomer, and $n$ is greater than 1, there is some evidence that a portion of the peroxidized monomer is present in the monomeric form. The structure, therefore, is in doubt, but it is known that the peroxidized monomer does form chains which contain a plurality of the groups R—O—O—, wherein R is the residue of the nongaseous vinyl monomer. In actuality, the formula for the peroxidized monomer is more correctly given as

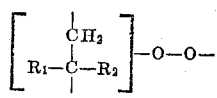

wherein $R_1$ and $R_2$ have the same designation as in the definition of the "vinyl monomer" given above.

Any of the aforementioned nongaseous vinyl monomers may be used in the preparation of the peroxidized vinyl monomers. For example, styrene, α-methyl styrene, vinyl acetate, acrylonitrile, ethylene dimethylacrylate, methyl acrylate, methyl methacrylate, beta-methylstyrene, allyl benzene, butyl methacrylate, butyl acrylate, beta-bromostyrene, methyl vinyl ketone, vinyl butyrate, and vinyl propionate may be employed. Other vinyl monomers may likewise be used as can mixtures of such monomers.

In carrying out the polymerization process of the present invention, the peroxidic oxygen (—O—O—) will be present in amounts of from about 0.05 to about 5%, preferably about 0.1 to about 1.5%, based on the total weight of the monomer present in the composition (including the monomer which is peroxidized). The amount of the alkyl aluminum compound can be varied as desired. However, amounts from about 0.5 to about 20%, preferably about 1 to about 5%, are employed with good results. When using the greater concentration of peroxidic oxygen, less aluminum alkyl compound is necessary and vice versa.

While the use of a free radical initiating azo compound is optional in the invention, it is desirable when a fast reaction and/or a high percent conversion is desired. The amount employed will vary from 0 to 5% by weight based on the total weight of the vinyl monomers present in the composition. It is preferred that it be used in amounts of at least about 0.5% and more preferably from about 0.5 to about 1.5%. When using such concentrations, the reaction rate and percent conversion will be very high.

An oxygen containing gas, although it is not essential to the reaction, is also desirable in order to hasten the reaction and improve conversions. Air is particularly well-suited as the oxygen containing gas because of its cheapness. However, it has been found that somewhat improved conversions can be obtained if the oxygen in the gas is present in amounts below 10% by volume, preferably 2 to 5%. For this reason it may be desirable to adjust the concentration if the improved yield justifies the expense.

The dramatic improvement in the percent conversion which may be obtained by utilizing the present invention can readily be seen by reference to the drawing. The drawing shows a plot of the Temperature Rise or Percent Conversion vs. Time. When one bears in mind that the reaction is exothermic, it is obvious that the Temperature Rise can be equated to the Percent Conversion when the reaction is carried out in a well-insulated reactor. The dotted line on the graph merely shows that the reaction is substantially complete and the reactor has started to cool. However, the graph is relative and contains no values as these vary with each monomer system employed.

In the drawing, the curve I represents the results obtained when using only the alkyl aluminum compound and oxygen as described in the aforementioned copending application. The percent conversion is represented by the peak of curve I as represented by the horizontal line I. When the peroxidized vinyl monomer is added to the system, the percent conversion increases to that shown by the peak of curve II which is represented by the horizontal line II. The percent conversion is increased to an even greater extent when the free radical initiating azo compound is added to the system as shown by the peak of curve III as represented by the horizontal line III.

The following examples are given to illustrate the invention and are not intended to limit it in any manner. All parts are given in parts by weight unless otherwise expressed.

The peroxidic oxygen content is determined by using approximately a 3 gram sample of the peroxidized monomer. The sample is added to 25 ml. of an isopropanol/acetic acid solution (prepared by adding 55 cc. of acetic acid and 150 cc. isopropanol) and then adding 10 ml. of sodium iodide in isopropanol solution (22 g. sodium iodide and 100 cc. isopropanol). The mixture is refluxed for 5 minutes and then titrated with 0.1000 normal $Na_2S_2O_3$ solution (water). The peroxidic oxygen is then calculated according to the equation $$\text{Percent}(-O-O-) = \frac{\text{ml. of } Na_2S_2O_3 \times 0.1 \times 1.6}{\text{weight of sample}}$$

In Examples 1 to 3, no free radical initiating azo compound is used in the polymerization reaction. In Examples 4 to 17, the azo compound is used as a catalyst for the peroxidation of the vinyl monomer and the residual azo compound is carried over into the polymerization procedure. The residual amounts, however, are not actually determined in the examples although it is known that the half-life of the azo-bis-isobutyronitrile at 57–58° C. is about 40 hours (see graph in Walling, "Free Radicals in Solution," p. 469 [1957]). From this it can be estimated that about 65–75% of the original azo compound still remains after peroxidation is stopped. In Examples 18 to 21, measured amounts of the free radical initiating azo compound are used.

EXAMPLE 1

*Procedure A.—Preparation of peroxidized monomer*

The peroxidized monomer is prepared in accordance with the method set forth in "Journal of the American Chemical Society," vol. 78, p. 1017, 1956, and vol. 80, p. 2465, 1958, by merely bubbling oxygen through the monomer without employing a catalyst. A two-necked flask (250 cc. capacity) equipped with a gas inlet tube and gas outlet needle is flushed with nitrogen and charged with 120 cc. of liquid vinyl propionate (B.P. 90–95° C.). The flask is placed in a water bath maintained at a temperature of 57–58° C. Oxygen is bubbled into the liquid so as to give a steady stream of bubbles until the peroxidic oxygen (—O—O—) content is 0.065% by weight based on the weight of the monomer.

*Procedure B.—Polymerization of vinyl propionate employing triethyl aluminum/$O_2$/peroxidized vinyl propionate as the catalyst*

A 25 cc. insulated beaker is charged with 9 cc. 8.2 grams of the vinyl propionate (containing 0.065% of peroxidic oxygen) and 0.20 gram of triethyl aluminum contained in 1 cc. of solution (1.8 molar triethyl aluminum in hexane). The beaker is left open to the oxygen of the air while polymerization is carried out. A magnetic stirring element is dropped into the beaker and the beaker contents stirred at moderate speed for 3.25 minutes. The temperature of the contents of the beaker rises about 39.5° C. above room temperature during the course of the reaction. After the 3.25 minutes, the polymerization is substantially complete resulting in a tacky mass of highly viscous polyvinyl propionate.

The contents of the beaker are transferred to a one liter beaker containing about 500 cc. of petroleum ether and 5–10 cc. of 2% HCl (water) solution. The contents of the beaker are stirred for approximately 30 minutes. The polymer, which precipitates from the solution, is separated from the petroleum ether by filtering and then dried in a vacuum desiccator and weighed. The percent conversion obtained is 29.0%.

*Procedure C.—Control*

Procedure B is repeated employing 9 cc. 8.2 grams of vinyl propionate containing no peroxidic oxygen. After separation of the polymer, the percent conversion is less than 10%.

EXAMPLE 2

*Procedure A.—Preparation of peroxidized monomer*

The peroxidized monomer is prepared in accordance with the method set forth in "Journal of the American Chemical Society," vol. 78, p. 1017, 1956 and vol. 80, p. 2465, 1958. A two-necked flask (250 cc. capacity)

equipped with a gas inlet tube and gas outlet needle is flushed with nitrogen and charged with 120 cc. of liquid styrene (B.P. 30–35° C. 8 mm.) and 0.1 gram of azo-bis-isobutyronitrile (catalyst). The flask is placed in a water bath maintained at a temperature of 57–58° C. Oxygen is bubbled into the liquid so as to give a steady stream of bubbles for a period of 24 hours. After the 24 hour period, the oxygen flow is terminated and the liquid flushed free of oxygen by moderately bubbling nitrogen gas through the liquid for about 1 hour.

After bubbling nitrogen gas through the liquid, the peroxidized styrene is precipitated in methanol, dissolved in benzene and reprecipitated by adding methanol to the benzene. The precipitation procedure removes any residual amounts of the azo-bis-isobutyronitrile (catalyst).

The peroxidic oxygen (—O—O—) content of the peroxidized styrene is found by analysis to be 2.3% by weight.

*Procedure B.—Polymerization of styrene employing triethyl aluminum/$O_2$/peroxidized styrene as the catalyst*

A 25 cc. insulated beaker is charged with 9 cc. 8.1 grams of liquid styrene solution containing 0.44 gram of peroxidized styrene (containing the 2.3% peroxidic oxygen). Then 0.20 gram of triethyl aluminum in 1 cc. solution (1.8 molar triethyl aluminum in hexane) are added. The beaker is left open to the oxygen of the air while polymerization is carried out. A magnetic stirring element is dropped into the beaker and the beaker contents stirred at moderate speed for 37¼ minutes. The temperature of the contents of the beaker rises about 28.7° C. above room temperature during the course of the reaction. After the 37¼ minutes, the polymerization is substantially complete resulting in a viscous mass.

The contents of the beaker are transferred to a 1 liter beaker containing petroleum ether and HCl solution and purified according to the procedure of Example 1. The percent conversion obtained is 6.2%.

EXAMPLE 3

*Procedure A.—Preparation of peroxidized monomer*

Procedure A of Example 2 is repeated. The peroxidic oxygen (—O—O—) content of the peroxidized styrene is 2.3% by weight.

*Procedure B.—Polymerization of vinyl propionate employing triethyl aluminum/$O_2$/peroxidized styrene as catalyst*

A 25 cc. insulated breaker is charged with 9 cc. 8.2 grams of liquid vinyl propionate solution containing 0.44 gram of perioxidized styrene (containing the 2.3% of peroxidic oxygen). Then 0.20 gram of triethyl aluminum in 1 cc. solution (1.8 molar triethyl aluminum in hexane) are added. The beaker is left open to the oxygen of the air while polymerization is carried out. A magentic stirring element is dropped into the beaker and the beaker contents stirred at moderate speed for 20 minutes. The temperature of the contents of the beaker rises about 57.5° C. above room temperature during the course of the reaction. After the 20 minutes, the polymerization is substantially complete resulting in a viscous mass.

The contents of the beaker are transferred to a 1 liter beaker containing petroleum ether and HCl solution and purified according to the procedure of Example 1. The percent conversion obtained is 25–30%.

*Procedure C.—Control*

Procedure B above is repeated employing 9 cc. 8.2 grams of vinyl propionate containing no peroxidized styrene. After separation of the polymer the percent conversion is less than 10%.

EXAMPLES 4–8

*Procedure A.—Preparation of peroxidized monomer*

The peroxidized monomer is prepared in accordance with the method set forth in "Journal of the American Chemical Society," vol. 78, p. 1017, 1956, and vol. 80, p. 2465, 1958. A two-necked flask (250 cc. capacity) equipped with a gas inlet tube and gas outlet needle is flushed with nitrogen and charged with 120 cc. of liquid vinyl propionate (B.P. 90–95° C.) and 0.1 g. of azo-bis-isobutyronitrile (catalyst). The flask is placed in a water bath maintained at a temperature of 57–58° C. Oxygen is bubbled into the liquid so as to give a steady stream of bubbles for a period of 24 hours. After the 24 hour period, the oxygen flow is terminated and the liquid flushed free of oxygen by moderately bubbling nitrogen gas through the liquid for about 1 hour.

The peroxidic oxygen (—O—O—) content of the peroxidized vinyl propionate is found by analysis to be 0.326% by weight.

*Procedure B.—Polymerization of vinyl propionate employing triethyl aluminum/$O_2$/peroxidized vinyl propionate/residual azo compound as the catalyst*

In Examples 4–8, a 25 cc. insulated beaker is charged with the indicated amount of peroxidized vinyl propionate (density 0.91), containing 0.326% of peroxidic oxygen and the residual azo compound. 0.20 gram of triethyl aluminum contained in 1 cc. of solution (1.8 molar triethyl aluminum in hexane) is then added. The beaker is left open to the oxygen of the air while polymerization is carried out. A magnetic stirring element is dropped into the beaker and the beaker contents stirred at moderate speed for the indicated time. The temperature of the contents of the beaker rises above room temperature during the course of the reaction. After the indicated time, the polymerization is substantially complete resulting in a tacky mass of highly viscous polyvinyl propionate.

The contents of the beaker are transferred to a one liter beaker containing about 500 cc. of petroleum ether and 5–10 cc. of 2% HCl (water) solution. The contents of the beaker are stirred for approximately 30 minutes. The polymer, which precipitates from the solution, is separated from the petroleum ether by filtering, and then it is dried in a vacuum desiccator and weighed. The percent conversion obtained is given in Table I.

As a control to Examples 4–8, procedure B is repeated employing 9 cc. of vinyl propionate containing no peroxidic oxygen. The results of the Control Run are given in Table I.

TABLE I

| Example | Cc. of Peroxidized Vinyl Propionate | Percent Peroxidic Oxygen by Weight | Cc. of Vinyl Propionate | Grams of Triethyl Aluminum | Rise in Temp. in 1st Half Minute (° C.) | Maximum Rise in Temp. (° C.) | Total Time of Run (Min.) | Percent Conversion Per Minute | Total Conversion, Percent |
|---|---|---|---|---|---|---|---|---|---|
| 4 | 9.0 | 0.326 | 0.0 | 0.20 | 51.25 | 94.50 | 3.0 | 25.5 | 76.5 |
| 5 | 7.0 | 0.254 | 2.0 | 0.20 | 50.00 | 91.25 | 2.8 | 23.8 | 66.6 |
| 6 | 5.0 | 0.179 | 4.0 | 0.20 | 54.00 | 96.25 | 3.5 | 19.7 | 69.0 |
| 7 | 3.0 | 0.109 | 6.0 | 0.20 | 37.50 | 78.75 | 5.2 | 13.8 | 71.6 |
| 8 | 1.0 | 0.036 | 8.0 | 0.20 | 21.25 | 35.00 | 4.0 | 4.9 | 19.7 |
| Control | None | None | 9.0 | 0.20 | | | about 3 | | <10 |

EXAMPLE 9

The procedure of Example 4 is repeated with the exception that the beaker is closed and maintained under a nitrogen atmosphere during polymerization and a reaction time of about 11 minutes is used rather than 3 minutes. The percent conversion is found to be 5–10%.

The example illustrates that the reaction will proceed in the substantial absence of oxygen although the percent conversion will be much lower.

Control

The procedure of Example 9 is repeated with the exception that a vinyl propionate containing no peroxidic oxygen is employed for the polymerization. After 11 minutes, no polymer is noted in the beaker.

The example demonstrates the necessity of having the peroxidized monomer present in the composition.

EXAMPLE 10

*Procedure A.—Preparation of peroxidized monomer*

Procedure A of Example 4 is repeated employing 120 cc. of liquid vinyl butyrate (B.P. 115–177° C.) instead of liquid vinyl propionate. The peroxidic oxygen (—O—O—) content is not determined.

*Procedure B.—Polymerization of vinyl butyrate employing triethyl aluminum/$O_2$/peroxidized vinyl butyrate/ residual azo compound as the catalyst*

A 25 cc. insulated beaker is charged with 9 cc. 8.1 grams of the peroxidized liquid vinyl butyrate containing the peroxidic oxygen and residual azo compound. Then 0.20 gram of triethyl aluminum in 1 cc. solution (1.8 molar triethyl aluminum in hexane) are added. The beaker is left open to the oxygen of the air while polymerization is carried out. A magnetic stirring element is dropped into the beaker and the beaker contents stirred at moderate speed for 4 minutes. The temperature of the contents of the beaker rises about 67.5° C. above room temperature during the course of the reaction. After the 4 minutes, the polymerization is substantially complete resulting in a viscous mass.

The contents of the beaker are transferred to a 1 liter beaker containing petroleum ether and HCl solution and purified according to the procedure of Example 1. The percent conversion obtained is 45.6%.

EXAMPLE 11

*Procedure A.—Preparation of peroxidized monomer*

Procedure A of Example 4 is repeated employing 120 cc. of liquid vinyl acetate (B.P. 71–73° C.) instead of liquid vinyl propionate. The peroxidic oxygen (—O—O—) content of the peroxidized vinyl acetate is found by analysis to be 0.288% by weight.

*Procedure B.—Polymerization of vinyl acetate employing triethyl aluminum/$O_2$/peroxidized vinyl acetate/ residual azo compound as the catalyst*

A 25 cc. insulated beaker is charged with 9 cc. 8.1 grams of peroxidized liquid vinyl acetate (containing 0.288% of peroxidic oxygen and the residual azo compound) and 0.20 gram of triethyl aluminum in 1 cc. solution (1.8 molar triethyl aluminum in hexane). The beaker is left open to the oxygen of the air while polymerization is carried out. A magnetic stirring element is dropped into the beaker and the beaker contents stirred at moderate speed for 8 minutes. The temperature of the contents of the beaker rises about 60° C. above room temperature during the course of the reaction. After the 8 minutes, the polymerization is substantially complete resulting in a semi-solid mass.

The contents of the beaker are transferred to a 1 liter beaker containing petroleum ether and HCl solution and purified according to the procedure of Example 1. The percent conversion obtained is above 90%.

EXAMPLE 12

*Procedure A.—Preparation of peroxidized monomer*

Procedure A of Example 4 is repeated employing 120 cc. of liquid ethylene dimethacrylate (B.P. 83–85° C. at 1 mm.) instead of liquid vinyl propionate. The peroxidic oxygen (—O—O—) content of the peroxidized ethylene dimethacrylate is not determined.

*Procedure B.—Polymerization of ethylene dimethacrylate employing triethyl aluminum/$O_2$/peroxidized ethylene dimethacrylate/residual azo compound as the catalyst*

A 25 cc. insulated beaker is charged with 9 cc. 9.3 grams of peroxidized ethylene dimethacrylate (containing the peroxidic oxygen and the residual azo compound) and 0.20 gram of triethyl aluminum in 1 cc. solution (1.8 molar triethyl aluminum in hexane). The beaker is left open to the oxygen of the air while polymerization is carried out. A magnetic stirring element is dropped into the beaker and the beaker contents stirred at moderate speed for 4 minutes. The temperature of the contents of the beaker rises about 74.4° C. above room temperature during the course of the reaction. After the 4 minutes, the polymerization is substantially complete resulting in a glossy solid.

The percent conversion obtained is nearly 100%.

EXAMPLE 13

*Procedure A.—Preparation of peroxidized monomer*

Procedure A of Example 4 is repeated employing 120 cc. of liquid n-butyl acrylate (B.P. 144–146° C.) instead of liquid vinyl propionate. The peroxidic oxygen (—O—O—) content of the peroxidized n-butylacrylate is found by analysis to be 0.346% by weight.

*Procedure B.—Polymerization of n-butyl acrylate employing triethyl aluminum/$O_2$/peroxidized n-butyl acrylate/residual azo compound as the catalyst*

A 25 cc. insulated beaker is charged with 9 cc. 8.1 grams of peroxidized n-butyl acrylate (containing 0.346% of peroxidic oxygen and the residual azo compound) and 0.20 gram of triethyl aluminum in 1 cc. solution (1.8 molar triethyl aluminum in hexane). The beaker is left open to the oxygen of the air while polymerization is carried out. A magnetic stirring element is dropped into the beaker and the beaker contents stirred at moderate speed for 40 seconds. The temperature of the contents of the beaker rises about 63.12° C. above room temperature during the course of the reaction. After the 40 seconds, the polymerization is substantially complete resulting in a viscous mass.

EXAMPLE 14

*Procedure A.—Preparation of peroxidized monomer*

The procedure A of Example 4 is repeated. The peroxidized monomer is concentrated by evaporation after bubbling the nitrogen gas through the liquid. It is then taken up in 20 cc. of acetone. The peroxidic oxygen (—O—O—) content of the peroxidized monomer is found by analysis to be 0.232% by weight based on the weight of the total solution.

*Procedure B.—Polymerization of vinyl propionate employing diisobutyl aluminum hydride/$O_2$/peroxidized vinyl propionate/residual azo compound as the catalyst*

A 25 cc. insulated beaker is charged with 9 cc. 8.2 grams of liquid vinyl propionate and 2 cc. of peroxidized vinyl propionate solution (containing 0.232% of peroxidic oxygen and the residual azo compound) and 0.2 gram of diisobutyl aluminum hydride contained in 1.6 cc. solution (1.20 molar diisobutyl aluminum hydride in hexane). The beaker is left open to the oxygen of the air while polymerization is carried out. A magnetic stirring element is dropped into the beaker and the beaker contents stirred at moderate speed for 8½ minutes. The temperature of the contents of the beaker rises about 30.5° C. above room temperature during the course of the reaction. After the 8½ minutes, the polymerization is substantially complete resulting in a viscous mass.

The contents of the beaker are transferred to a 1 liter beaker containing petroleum ether and HCl solution and purified according to the procedure of Example 1. The percent conversion obtained is 22.2%.

EXAMPLES 15–17

When Example 14 is repeated employing (A) diethyl aluminum chloride, (B) triisobutyl aluminum, and (C) a 50–50 weight mixture of triisobutyl aluminum/diisobutyl aluminum hydride in place of the triethyl aluminum of Example 14 substantially the same results are obtained.

EXAMPLE 18

*Procedure A.—Preparation of peroxidized monomer*

A peroxidized vinyl propionate is prepared in accordance with Procedure A of Example 1 so as to give a peroxidized monomer having a peroxidic oxygen (—O—O—) content of 0.065% as in Example 1.

*Procedure B.—Polymerization of vinyl propionate employing triethyl aluminum/$O_2$/peroxidized vinyl propionate/azo-bis-isobutyronitrile as the catalyst*

Procedure B of Example 1 is repeated with the exception that 0.1 gram of azo-bis-isobutyronitrile is added to the peroxidized monomer prior to the addition of the triethyl aluminum. In 4 minutes the temperature rises to 96.25° C. at which time the reaction is stopped.

The percent conversion is 51% as compared to the 29% of Example 1 which employs no free radical initiating azo compound.

EXAMPLE 19

The procedure of Example 18 is repeated with the exception that the reaction is not stopped at the end of 4 minutes. In this case the maximum rise in temperature is 87.5° C. and it occurs 7.6 minutes after initiation. The reaction is allowed to proceed for a total time of 12 minutes.

The percent conversion is found to be 79% as compared to the 29% obtained in Example 1 which employs no free radical initiating azo compound.

*Control*

As a control to Examples 18 and 19, the procedure of Example 18 is repeated employing pure vinyl propionate instead of the peroxidized vinyl propionate employed in Examples 18 and 19. The reaction is carried out for a total time of 7 minutes and the maximum rise in temperature is 28° C. which occurs 0.5 minute after initiation.

The percent conversion in the control run is 21% as compared to the 51% in Example 18 (reaction stopped at 4 minutes) and 79% in Example 19.

EXAMPLES 20–21

When Example 18 is repeated employing diethyl-2-azo-bis-isobutyrate and 2-azo-bis-2-methylheptonitrile in place of the azo-bis-isobutyronitrile, substantially the same results are obtained.

EXAMPLE 22

*Procedure A.—Preparation of diisobutyl aluminum hydride/butyl acrylate complex*

A 55 cc. test tube is deoxygenated in an oven at 120° C. for 2 hours and sealed with a rubber stopper. Two hypodermic needles as gas inlet and outlet are then inserted into the tube through the stopper and nitrogen is passed through the tube. 5 cc. of butyl acrylate (0.349 mole) is injected into the tube by hypodermic syringe and the tube is then cooled in an ice water bath. 6.4 cc. of diisobutyl aluminum hydride (0.349 mole) is slowly injected into the tube by hypodermic syringe. The resulting solution has a volume of 10.25 cc. and turns yellow on the formation of the complex.

*Procedure B.—Polymerization of vinyl propionate employing diisobutyl aluminum hydride complexed with butyl acrylate/$O_2$/peroxidized vinyl propionate/residual azo compound as the catalyst*

Procedure B of Example 14 is repeated employing 0.2 gram of diisobutyl aluminum hydride complexed with 0.18 gram of butyl acrylate (total weight of complex 0.38 gram).

The polymerization proceeds substantially as in Example 14 and the results are essentially the same. The example merely demonstrates that the aluminum alkyl compound may be employed in the form of a complex.

As demonstrated by the example, the polymerization readily proceeds at room temperature. However, lower or higher temperatures may be employed, if desired, as the reaction is exothermic and proceeds readily even at low temperatures.

While in the examples unmodified compositions are produced, it is obvious that other materials such as dyes, pigments, fibers, comonomers and other polymers may be introduced into the compositions of the present invention without substantial alteration of the physical properties of the products formed from the compositions. The compositions can be brushed or sprayed onto a surface to form protective films for wood, metal and the like. They may also be applied to glass surfaces to form a safety film on the glass. In addition the compositions may be formed into films which are suitable for wrapping materials moisture barriers and the similar products.

Many equivalent modifications will be apparent to those skilled in the art from a reading of the foregoing without a departure from the inventive concept.

The present application is a continuation-in-part of U.S. application, Serial No. 220,426, filed August 30, 1962, now abandoned.

What is claimed is:

1. A composition of matter comprising (A) a nongaseous vinyl monomer, (B) an alkyl aluminum compound containing from 1 to about 36 carbon atoms, (C) from 0 to about 5% by weight of a free radical initiating azo compound, and (D) a peroxidized vinyl monomer containing a plurality of the groups —R—O—O—, wherein R is the residue of a nongaseous vinyl monomer, with the peroxidic oxygen group (—O—O—) being present in amounts of at least about 0.05% by weight; all percentages being based on the total weight of the vinyl monomers present in the composition.

2. The composition of matter of claim 1 wherein the alkyl aluminum compound is present in amounts of from about 0.5 to about 20%.

3. The composition of matter of claim 1 wherein the alkyl aluminum compound is present in amounts of from about 1 to about 5%.

4. The composition of matter of claim 1 wherein the free radical initiating azo compound is present in amounts of from about 0.5 to about 5%.

5. The composition of matter of claim 1 wherein the free radical initiating azo compound is present in amounts of from about 0.5 to about 1.5%.

6. The composition of matter of claim 1 wherein the peroxidic oxygen group (—O—O—) is present in amounts of from about 0.05 to about 5%.

7. The composition of matter of claim 1 wherein the peroxidic oxygen group (—O—O—) is present in amounts of from about 0.1 to about 1.5%.

8. A composition of matter comprising (A) a nongaseous vinyl monomer, (B) from about 0.5 to about 20% by weight of an alkyl aluminum compound containing from 1 to about 36 carbon atoms, (C) from 0.5 to about 5% by weight of a free radical initiating azo compound, and (D) a peroxidized vinyl monomer containing a plurality of the groups —R—O—O—, wherein R is the residue of a nongaseous vinyl monomer, with the peroxidic oxygen group (—O—O—) being present in amounts of from about 0.05 to about 5% by weight; all percentages being based on the total weight of the vinyl monomers present in the composition.

9. A composition of matter comprising (A) a nongaseous vinyl monomer, (B) from about 1 to about 5% by weight of an alkyl aluminum compound containing from 1 to about 36 carbon atoms, (C) from 0.5 to about 1.5% by weight of azo-bis-isobutyronitrile, and (D) a peroxidized vinyl monomer containing a plurality of the groups —R—O—O—, wherein R is the residue of a nongaseous vinyl monomer, with the peroxidic oxygen group (—O—O—) being present in amounts of from about 0.1 to about 1.5% by weight; all percentages being based on the total weight of the vinyl monomers present in the composition.

10. The composition of matter of claim 9 wherein the nongaseous vinyl monomer (A) is an alkyl ester of acrylic acid.

11. The composition of matter of claim 9 wherein the nongaseous vinyl monomer (A) is ethylene dimethyacrylate.

12. The composition of matter of claim 9 wherein the nongaseous vinyl monomer (A) is vinyl acetate.

13. The composition of matter of claim 9 wherein the nongaseous vinyl monomer (A) is butyl acrylate.

14. The composition of matter of claim 9 wherein the nongaseous vinyl monomer (A) is vinyl propionate.

15. The composition of matter of claim 9 wherein the nongaseous vinyl monomer (A) is styrene.

16. The composition of matter of claim 9 wherein R is the residue of ethylene dimethacrylate.

17. The composition of matter of claim 9 wherein R is the residue of vinyl propionate.

18. In the process for the polymerization of a nongaseous vinyl monomer reactant by contacting said monomer with an alkyl aluminum compound containing from 1 to about 36 carbon atoms, the improvement which comprises carrying out the polymerization in the presence of (A) from 0 to about 5% by weight of a free radical initiating azo compound, and (B) a peroxidized vinyl monomer containing a plurality of the groups —R—O—O—, wherein R is the residue of a nongaseous vinyl monomer, with the peroxidic oxygen group (—O—O—) being present in amounts of at least about 0.05% by weight; all percentages being based on the total weight of the vinyl monomers present in the process.

19. The process of claim 18 wherein the free radical initiating azo compound is present in amounts of from about 0.5 to about 5%.

20. The process of claim 18 wherein the free radical initiating azo compound is present in amounts of from about 0.5 to about 1.5%.

21. The process of claim 18 wherein the peroxidic oxygen group (—O—O—) is present in amounts of from about 0.05 to about 5%.

22. The process of claim 18 wherein the peroxidic oxygen group (—O—O—) is present in amounts of from about 0.1 to about 1.5%.

23. In the process for the polymerization of a nongaseous vinyl monomer reactant by contacting said monomer with oxygen and an alkyl aluminum compound containing from 1 to about 36 carbon atoms, the improvement which comprises carrying out the polymerization in the presence of (A) from 0 to about 5% by weight of a free radical initiating azo compound, and (B) a peroxidized vinyl monomer containing a plurality of the groups —R—O—O—, wherein R is the residue of a nongaseous vinyl monomer, with the peroxidic oxygen group (—O—O—) being present in amounts of at least about 0.05% by weight; all percentages being based on the total weight of the vinyl monomers present in the process.

24. The process of claim 23 wherein the free radical initiating azo compound is present in amounts of from about 0.5 to about 5%.

25. The process of claim 23 wherein the free radical initiating azo compound is present in amounts of from about 0.5 to about 1.5%.

26. The process of claim 23 wherein the peroxidic oxygen group (—O—O—) is present in amounts of from about 0.05 to about 5%.

27. The process of claim 23 wherein the peroxidic oxygen group (—O—O—) is present in amounts of from about 0.1 to about 1.5%.

28. In the process for the polymerization of a nongaseous vinyl monomer reactant by contacting said monomer with oxygen and an alkyl aluminum compound containing from 1 to about 36 carbon atoms, the improvement which comprises carrying out the polymerization in the presence of (A) from 0.5 to about 1.5% by weight of azo-bis-isobutyronitrile, and (B) a peroxidized vinyl monomer containing a plurality of the groups —R—O—O—, wherein R is the residue of a nongaseous vinyl monomer, with the peroxidic oxygen (—O—O—) being present in amounts of at least about 0.1 to about 1.5% by weight; all percentages being based on the total weight of the vinyl monomers present in the process.

29. The process of claim 28 wherein the nongaseous vinyl monomer reactant is an alkyl ester of acrylic acid.

30. The process of claim 29 wherein the nongaseous vinyl monomer reactant is ethylene dimethacrylate.

31. The process of claim 29 wherein the nongaseous vinyl monomer reactant is vinyl acetate.

32. The process of claim 29 wherein the nongaseous vinyl monomer reactant is butyl acrylate.

33. The process of claim 29 wherein the nongaseous vinyl monomer reactant is vinyl propionate.

34. The process of claim 29 wherein the nongaseous vinyl monomer reactant is styrene.

35. The process of claim 29 wherein R is the residue of ethylene dimethacrylate.

36. The process of claim 29 wherein R is the residue of vinyl propionate.

References Cited by the Examiner

UNITED STATES PATENTS

| | | | |
|---|---|---|---|
| 2,868,772 | 1/59 | Ray et al. | 260—94.9 |
| 3,069,403 | 12/62 | Prapas | 260—89.1 |
| 3,117,112 | 1/64 | Mirable et al. | 260—89.5 XR |

JOSEPH L. SCHOFER, *Primary Examiner.*